(12) United States Patent
Kishiyama

(10) Patent No.: US 10,615,947 B2
(45) Date of Patent: Apr. 7, 2020

(54) MOBILE TERMINAL APPARATUS, BASE STATION APPARATUS AND COMMUNICATION CONTROL METHOD

(71) Applicant: NTT DOCOMO, INC., Tokyo (JP)

(72) Inventor: Yoshihisa Kishiyama, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/825,780

(22) Filed: Nov. 29, 2017

(65) Prior Publication Data

US 2018/0083761 A1   Mar. 22, 2018

Related U.S. Application Data

(63) Continuation of application No. 15/052,144, filed on Feb. 24, 2016, now abandoned, which is a
(Continued)

(30) Foreign Application Priority Data

Feb. 18, 2011   (JP) ................... 2011-033388

(51) Int. Cl.
*H04B 7/005* (2006.01)
*H04L 5/14* (2006.01)
(Continued)

(52) U.S. Cl.
CPC ............ *H04L 5/14* (2013.01); *H04L 5/0007* (2013.01); *H04L 5/0028* (2013.01);
(Continued)

(58) Field of Classification Search
CPC ....... H04L 5/14; H04L 5/0007; H04L 5/0028; H04L 5/0042; H04L 5/16; H04L 5/0087; H04L 5/0092; H04L 5/143; H04L 5/1453
See application file for complete search history.

(56) References Cited

U.S. PATENT DOCUMENTS 6,467,059 B1   10/2002   Ohashi
6,493,560 B1   12/2002   Guan et al.
(Continued)

FOREIGN PATENT DOCUMENTS

CN   101835174 A   9/2010
JP   2000-078150 A   3/2000
(Continued)

OTHER PUBLICATIONS

Extended European Search Report issued in corresponding European Application No. 12746661.3, dated Feb. 7, 2018 (19 pages).
(Continued)

*Primary Examiner* — Stephen M D Agosta
(74) *Attorney, Agent, or Firm* — Osha Liang LLP

(57) ABSTRACT

A user apparatus includes a transmission/reception circuit that transmits an uplink signal and receives a downlink signal; and a control circuit that switches to transmitting, as the uplink signal, an uplink control signal or a random access channel signal within a time interval configured of a plurality of symbols, after a given interval that is provided to prevent transmission of the uplink signal and reception of the downlink signal from overlapping each other within the time interval, by using a format in which first several symbols are blanked in the time interval.

4 Claims, 10 Drawing Sheets

Related U.S. Application Data continuation of application No. 13/980,319, filed as application No. PCT/JP2012/053818 on Feb. 17, 2012, now Pat. No. 9,306,726.

(51) Int. Cl.
*H04L 5/00* (2006.01)
*H04L 5/16* (2006.01)

(52) U.S. Cl.
CPC .............. *H04L 5/0042* (2013.01); *H04L 5/16* (2013.01); *H04L 5/0087* (2013.01); *H04L 5/0092* (2013.01); *H04L 5/143* (2013.01); *H04L 5/1453* (2013.01)

(56) References Cited

U.S. PATENT DOCUMENTS

| | | | |
|---|---|---|---|
| 6,707,798 B1 | 3/2004 | Klein et al. | |
| 6,885,868 B1 | 4/2005 | Naim et al. | |
| 7,486,647 B2 | 2/2009 | Schrader et al. | |
| 7,764,659 B2* | 7/2010 | Lenzini | H04W 72/1257 370/336 |
| 9,306,726 B2 | 4/2016 | Kishiyama | |
| 2002/0067709 A1 | 6/2002 | Yamada et al. | |
| 2002/0080816 A1 | 6/2002 | Spinar et al. | |
| 2007/0082672 A1* | 4/2007 | Fujioka | H04B 7/26 455/436 |
| 2009/0135748 A1* | 5/2009 | Lindoff | H04W 72/048 370/296 |
| 2009/0175235 A1 | 7/2009 | Spinar et al. | |
| 2009/0185632 A1* | 7/2009 | Cai | H04L 5/0044 375/260 |
| 2009/0285164 A1 | 11/2009 | Chin et al. | |
| 2010/0008332 A1 | 1/2010 | Balachandran et al. | |
| 2010/0189046 A1 | 7/2010 | Baker et al. | |
| 2011/0007695 A1* | 1/2011 | Choi | H04L 5/0007 370/329 |
| 2012/0122472 A1* | 5/2012 | Krishnamurthy | H04L 5/0053 455/456.1 |
| 2013/0301486 A1 | 11/2013 | Kishiyama | |
| 2015/0280894 A1 | 10/2015 | Charbit et al. | |

FOREIGN PATENT DOCUMENTS

| | | |
|---|---|---|
| JP | 2002-185477 A | 6/2002 |
| JP | 2003-324412 A | 11/2003 |
| JP | 2010-541381 A | 12/2010 |

OTHER PUBLICATIONS

Catt; "Considerations on Backhaul UCI Transmission"; 3GPP TSG RAN WG1 Meeting #60, R1-100898; San Francisco, USA; Feb. 22-26, 2010 (3 pages).

LG Electronics Inc.; "Further Consideration on Uplink Timing Alternatives"; TSG-RAN WG1 Meeting #60b, R1-102427; Beijing, China; Apr. 12-16, 2010 (7 pages).

International Search Report issued in PCT/JP2012/053818 dated Mar. 13, 2012 (3 pages).

3GPP TR 25.912 V7.1.0; "3rd Generation Partnership Project; Technical Specification Group Radio Access Network; Feasibility study for evolved Universal Terrestrial Radio Access (UTRA) and Universal Terrestrial Radio Access Network (UTRAN) (Release 7)"; Sep. 2006 (57 pages).

Office Action issued in corresponding Japanese Application No. 2011-033388, dated Aug. 20, 2013 (4 pages).

Office Action issued in corresponding Japanese Application No. 2011-033388, dated Dec. 3, 2013 (6 pages).

Office Action in counterpart Chinese Patent Application No. 201280009316.6, dated Aug. 31, 2016 (13 pages).

Partial Supplementary European Search Report issued in the counterpart European Patent Application No. 12746661.3, dated Nov. 24, 2017 (17 pages).

Nortel; "Analysis of HD-FDD error and TX/RX conflict scenarios"; 3GPP TSG RAN WG2 #62, R2-082244; Kansas City, USA, May 5-9, 2008 (3 pages).

Qualcomm Europe; "Benefits of blank subframes in Rel-9"; 3GPP TSG-RAN WG1 #58, R1-093103; Shenzhen, China, Aug. 24-28, 2009 (9 pages).

* cited by examiner

| DOWNLINK / UPLINK | PDSCH | PDCCH | PHICH | CSI-RS | PBCH |
|---|---|---|---|---|---|
| PUSCH | ERRONEOUS DETECTION | UPLINK HAS HIGHER PRIORITY (DOWNLINK HAS HIGHER PRIORITY IN A PARTICULAR SUBFRAME) | DOWNLINK HAS HIGHER PRIORITY | UPLINK HAS HIGHER PRIORITY | UPLINK HAS HIGHER PRIORITY (DOWNLINK HAS HIGHER PRIORITY IN A PARTICULAR SUBFRAME) |
| PERIODIC CQI (ON PUCCH) | UPLINK HAS HIGHER PRIORITY | UPLINK HAS HIGHER PRIORITY (TRANSMISSION AND RECEPTION IN THE SAME SUBFRAME (PUCCH FORMAT FOR HD-FDD)) | DOWNLINK HAS HIGHER PRIORITY (TRANSMISSION AND RECEPTION IN THE SAME SUBFRAME (PUCCH FORMAT FOR HD-FDD)) | UPLINK HAS HIGHER PRIORITY (DOWNLINK HAS HIGHER PRIORITY IN A PARTICULAR SUBFRAME) | UPLINK HAS HIGHER PRIORITY (DOWNLINK HAS HIGHER PRIORITY IN A PARTICULAR SUBFRAME) |
| ACK/NACK (ON PUCCH) | UPLINK HAS HIGHER PRIORITY | UPLINK HAS HIGHER PRIORITY (TRANSMISSION AND RECEPTION IN THE SAME SUBFRAME (PUCCH FORMAT FOR HD-FDD)) | ERRONEOUS DETECTION | UPLINK HAS HIGHER PRIORITY | UPLINK HAS HIGHER PRIORITY |
| POSITIVE SR (ON PUCCH) | DOWNLINK HAS HIGHER PRIORITY | UPLINK HAS HIGHER PRIORITY (TRANSMISSION AND RECEPTION IN THE SAME SUBFRAME (PUCCH FORMAT FOR HD-FDD)) | DOWNLINK HAS HIGHER PRIORITY (TRANSMISSION AND RECEPTION IN THE SAME SUBFRAME (PUCCH FORMAT FOR HD-FDD)) | UPLINK HAS HIGHER PRIORITY | UPLINK HAS HIGHER PRIORITY (DOWNLINK HAS HIGHER PRIORITY IN A PARTICULAR SUBFRAME) |
| SRS | UPLINK HAS HIGHER PRIORITY (TRANSMIT SRS AFTER RECEIVING PDSCH UP TO SOME POINT) | TRANSMISSION AND RECEPTION IN THE SAME SUBFRAME | TRANSMISSION AND RECEPTION IN THE SAME SUBFRAME | TRANSMISSION AND RECEPTION IN THE SAME SUBFRAME | TRANSMISSION AND RECEPTION IN THE SAME SUBFRAME |
| PRACH | DOWNLINK HAS HIGHER PRIORITY | UPLINK HAS HIGHER PRIORITY (TRANSMISSION AND RECEPTION IN THE SAME SUBFRAME (PRACH FORMAT FOR HD-FDD)) | DOWNLINK HAS HIGHER PRIORITY (TRANSMISSION AND RECEPTION IN THE SAME SUBFRAME (PRACH FORMAT FOR HD-FDD)) | UPLINK HAS HIGHER PRIORITY | UPLINK HAS HIGHER PRIORITY (DOWNLINK HAS HIGHER PRIORITY IN A PARTICULAR FRAME) |

FIG. 4

MOBILE TERMINAL APPARATUS, BASE STATION APPARATUS AND COMMUNICATION CONTROL METHOD

CROSS-REFERENCE TO RELATED APPLICATIONS

The present application is a continuation application of and, thereby, claims benefit under 35 U.S.C. § 120 to U.S. patent application Ser. No. 15/052,144 filed on Feb. 24, 2016, titled, "MOBILE TERMINAL APPARATUS, BASE STATION APPARATUS AND COMMUNICATION CONTROL METHOD," which is a divisional application of and, thereby, claims benefit under 35 U.S.C. § 120 to U.S. patent application Ser. No. 13/980,319 filed on Jul. 18, 2013, titled, "MOBILE TERMINAL APPARATUS, BASE STATION APPARATUS AND COMMUNICATION CONTROL METHOD," which is a national stage application of PCT Application No. PCT/JP2012/053818, filed on Feb. 17, 2012, which claims priority to Japanese Patent Application No. 2011-033388 filed on Feb. 18, 2011. The contents of the priority applications are incorporated by reference in their entirety.

TECHNICAL FIELD

The present invention relates to a mobile terminal apparatus, base station apparatus and communication control method in the next-generation mobile communication system.

BACKGROUND ART

In UMTS (Universal Mobile Telecommunications System) networks, for the purpose of improving spectral efficiency and further improving data rates, by adopting HSDPA (High Speed Downlink Packet Access) and HSUPA (High Speed Uplink Packet Access), it is performed exploiting maximum features of the system based on W-CDMA (Wideband Code Division Multiple Access). For the UMTS network, for the purpose of further increasing high-speed data rates, providing low delay and the like, Long Term Evolution (LTE) has been studied (Non-patent Literature 1).

In the 3G system, a fixed band of 5 MHz is substantially used, and it is possible to achieve transmission rates of approximately maximum 2 Mbps in downlink. Meanwhile, in the LTE system, using variable bands ranging from 1.4 MHz to 20 MHz, it is possible to achieve transmission rates of maximum 300 Mbps in downlink and about 75 Mbps in uplink. Further, in the UMTS network, for the purpose of further increasing the wide-band and high speed, successor systems to LTE have been studied (for example, also called LTE Advanced (LTE-A) or LTE Enhancement).

In such a system, as a duplex scheme applied to radio systems, there are a Frequency Division Duplex (FDD) scheme and Time Division Duplex (TDD) scheme. In the FDD scheme, different frequency bands spaced a sufficient interval are used in uplink and downlink. In the TDD scheme, the same frequency band is used in uplink and downlink, and uplink communications and downlink communications are divided by time. In the FDD scheme, it is necessary to adequately widen the interval between the frequency bands used in uplink and downlink, and therefore, not only the base station apparatus but also the mobile terminal apparatus require a duplexer with high accuracy.

Further, mobile terminal apparatuses (Rel. 8 or later) of LTE system and its successor system support also a Half-duplex FDD scheme. In the Half-duplex FDD scheme, as in the FDD scheme, different frequency bands are used in uplink and downlink, while uplink communications and downlink communications are switched by time. Therefore, mobile terminal apparatuses do not need a duplexer with high accuracy, and it is possible to simplify the mobile terminal apparatuses.

CITATION LIST

Non-Patent Literature

[Non-patent Literature 1] 3GPP, TR25.912 (V7.1.0), "Feasibility study for Evolved UTRA and UTRAN", September 2006

SUMMARY OF THE INVENTION

Technical Ploblem

However, in mobile terminal apparatuses in the case where the Half-duplex FDD scheme is applied, optimization of operation still remains as an issue.

The present invention was made in view of such a respect, and it is an object of the invention to provide a mobile terminal apparatus, base station apparatus and communication control method that enable the Half-duplex FDD scheme to be optimized.

Solution to Problem

A mobile terminal apparatus of the invention is a mobile terminal apparatus that performs radio communications with a base station apparatus by a half-duplex scheme, and is characterized by having a transmission/reception section configured to transmit an uplink signal to the base station apparatus, and receive a downlink signal from the base station apparatus, and a control section configured to cause the transmission/reception section to selectively perform transmission of the uplink signal and reception of the downlink signal, based on a priority relationship defined between the uplink signal and the downlink signal, when transmission timing of the uplink signal and reception timing of the downlink signal overlaps each other.

Technical Advantage of the Invention

According to the invention, in the mobile terminal apparatus, when transmission timing of the uplink signal and reception timing of the downlink signal overlaps each other, transmission and reception processing is selectively performed. Accordingly, it is possible to cause the mobile terminal apparatus to which the half-duplex scheme is applied to perform optimal operation when transmission timing of the uplink signal and reception timing of the downlink signal overlaps each other.

BRIEF DESCRIPTION OF THE DRAWINGS

FIG. 4 is a table showing an example of a priority relationship between uplink signals and downlink signals;

DESCRIPTION OF EMBODIMENTS

Figure 1:
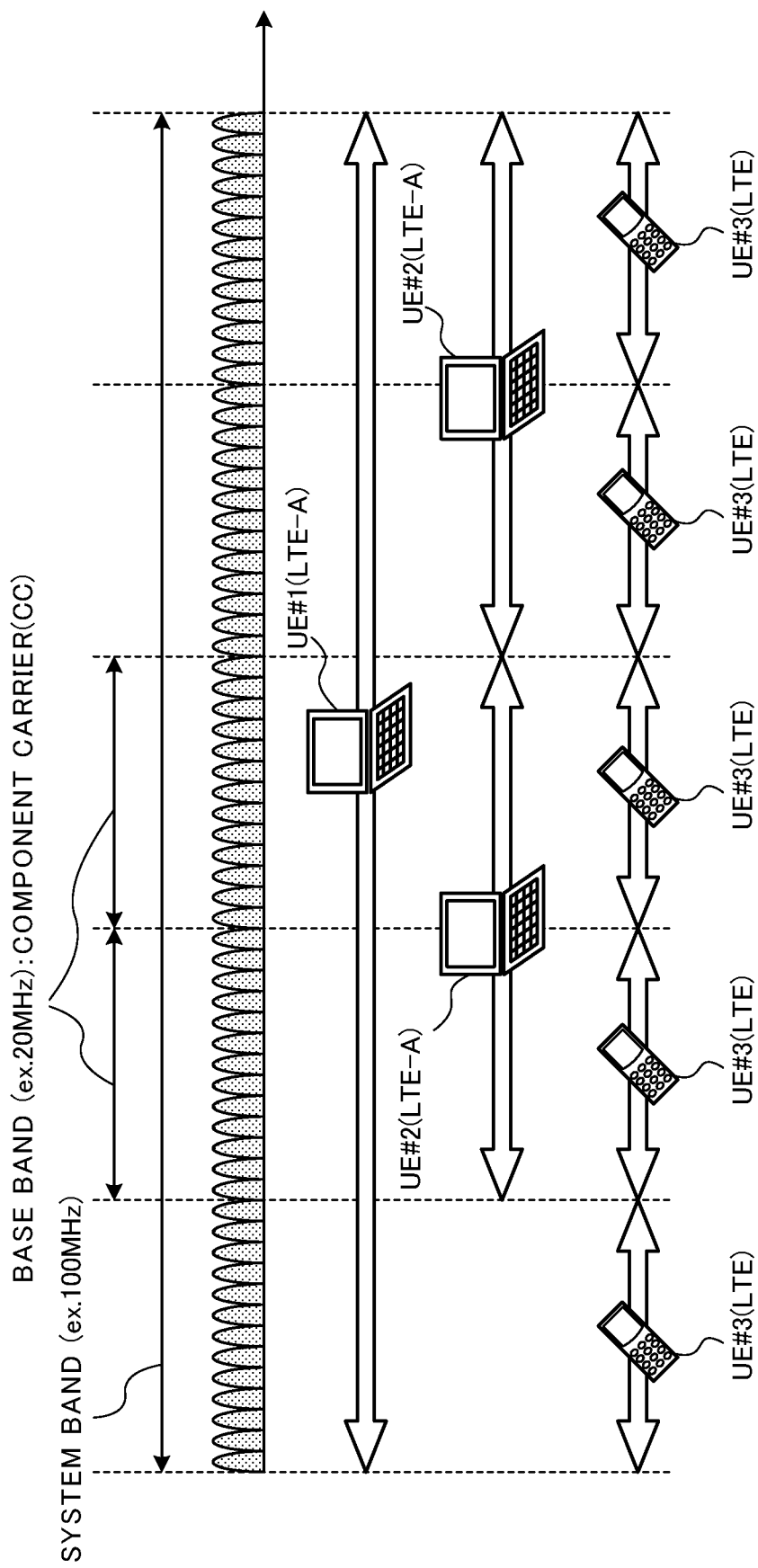
FIG. 1 is an explanatory view of a system band of an LTE system.

FIG. 1 is a diagram to explain a frequency usage state when mobile communications are performed in downlink. In addition, in all figures to explain the Embodiment, components having the same functions are assigned the same reference numerals to omit redundant descriptions. The example as shown in FIG. 1 is of the frequency usage state in the case of coexistence of LTE-A systems that are first communication systems having first relatively wide system bands comprised of a plurality of component carriers, and LTE systems that are second communication systems having a second relatively narrow system band (herein, comprised of a single component carrier). In the LTE-A systems, for example, radio communications are performed with a variable system bandwidth of 100 MHz or less, and in the LTE systems, radio communications are performed with a variable system bandwidth of 20 MHz or less. The system band of the LTE-A system is at least one base frequency region (component carrier: CC) with a system band of the LTE system as a unit. Thus integrating a plurality of base frequency regions to broaden the band is referred to as carrier aggregation.

For example, in FIG. 1, the system band of the LTE-A system is a system band (20 MHz×5=100 MHz) containing bands of five component carriers where the system band (base band: 20 MHz) of the LTE system is one component carrier. In FIG. 1, a mobile terminal apparatus UE (User Equipment) #1 is a mobile terminal apparatus supporting the LTE-A system (also supporting the LTE system), and has the system band of 100 MHz, UE #2 is a mobile terminal apparatus supporting the LTE-A system (also supporting the LTE system), and has the system band of 40 MHz (20 MHz×2=40 MHz), and UE #3 is a mobile terminal apparatus supporting the LTE system (not supporting the LTE-A system), and has the system band of 20 MHz (base band).

Figure 2:
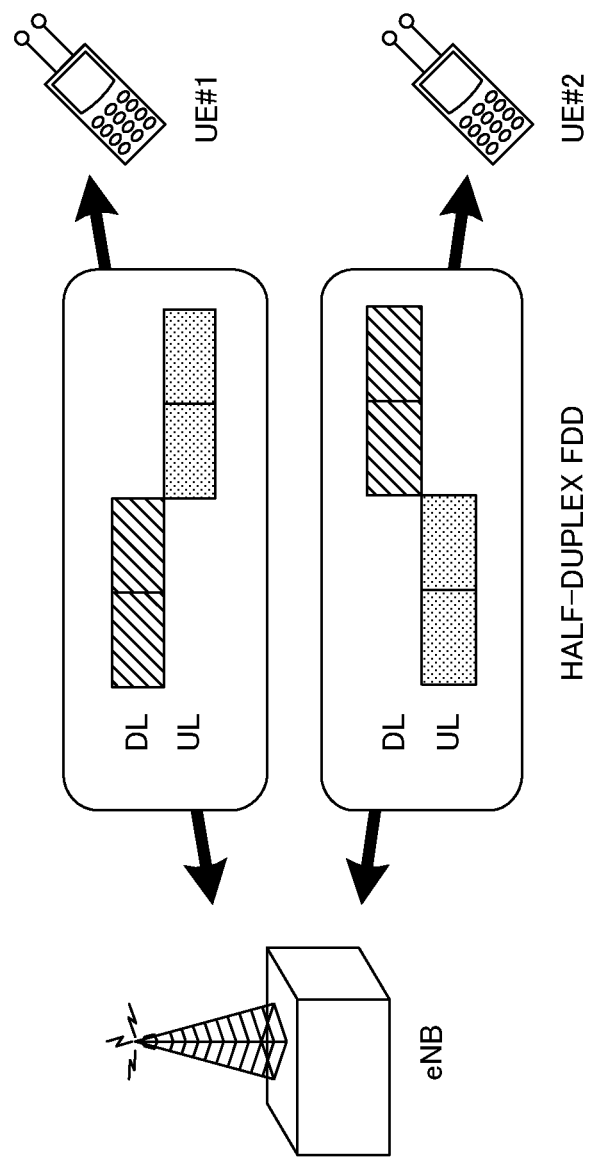
FIG. 2 is an explanatory view of a Half-duplex FDD scheme.

In addition, mobile terminal apparatus UEs of LTE system (Rel. 8) and its successor system (LTE-A system) support a Half-duplex FDD scheme (hereinafter, referred to as HD-FDD) as a duplex scheme. In HD-FDD, as shown in FIG. 2, uplink transmission/reception and downlink transmission/reception of a mobile terminal apparatus UE is divided both in frequency and time. Accordingly, the mobile terminal apparatus does simultaneously not perform uplink transmission and downlink reception.

In this case, in switching from downlink to uplink, the mobile terminal apparatus gives priority to transmitting an uplink subframe from the beginning, and ignores an end portion of a downlink subframe. Meanwhile, in switching from uplink to downlink, the mobile terminal apparatus controls uplink transmission timing to reserve a time to switch to downlink. However, such an operation of the mobile terminal apparatus is dependent on scheduling of the base station apparatus, and when uplink transmission and downlink reception occurs at the same time, there is a problem that the mobile terminal apparatus is not able to operate properly.

Therefore, the inventors of the present invention arrived at the invention to solve the problems. In other words, it is the gist of the invention to cause a mobile terminal apparatus to perform transmission/reception based on a priority relationship between an uplink signal and a downlink signal when uplink transmission timing and downlink reception timing overlaps each other in the mobile terminal apparatus. By this means, it is possible to optimize the operation of the mobile terminal apparatus to which is applied HD-FDD.

Herein, described is the operation of the mobile terminal apparatus when uplink transmission timing and downlink reception timing overlaps each other. FIG. 3 contains operation explanatory views of the mobile terminal apparatus when uplink transmission timing and downlink reception timing overlaps each other.

Figure 3A:
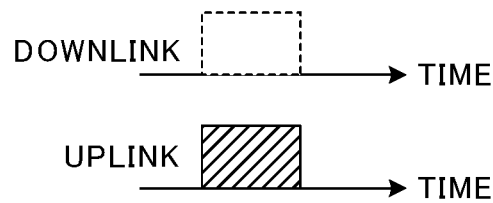
FIGS. 3A-3D contain operation explanatory views of a mobile terminal apparatus when uplink transmission timing and downlink reception timing overlaps each other.

When uplink transmission timing and downlink reception timing overlaps each other in a mobile terminal apparatus, the mobile terminal apparatus performs following four patterns of operation corresponding to the priority relationship between an uplink signal and a downlink signal. In a first pattern as shown in FIG. 3A, the mobile terminal apparatus gives a higher priority to transmission processing of an uplink signal than reception processing of a downlink signal. For example, when the uplink signal is more important (has a higher priority) than the downlink signal, the mobile terminal apparatus gives priority to transmission processing of the uplink signal. In addition, the mobile terminal apparatus does always not give priority to transmission processing of an uplink signal every time, and is capable of giving priority to reception processing of a downlink signal in a particular subframe corresponding to instructions from a base station apparatus.

Figure 3B:
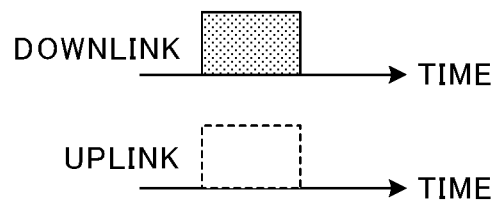

In a second pattern as shown in FIG. 3B, the mobile terminal apparatus gives a higher priority to reception processing of a downlink signal than transmission processing of an uplink signal. For example, when the downlink signal is more important (has a higher priority) than the uplink signal, the mobile terminal apparatus gives priority to reception processing of the downlink signal. In addition, the mobile terminal apparatus does always not give priority to reception processing of a downlink signal every time, and is capable of giving priority to transmission processing of an uplink signal in a particular subframe corresponding to instructions from a base station apparatus.

Figure 3C:
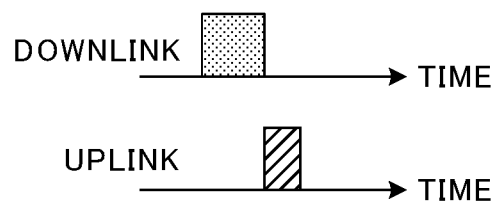

In a third pattern as shown in FIG. 3C, the mobile terminal apparatus performs both transmission processing of an uplink signal and reception processing of a downlink signal in a single subframe. For example, the mobile terminal apparatus gives priority to reception processing of the downlink signal up to some point of a subframe, while giving priority to transmission processing of the uplink signal in remaining symbols. In this case, by using a PUCCH format for HD-FDD or PRACH format for HD-FDD as described later, the mobile terminal apparatus may perform transmission processing of an uplink signal and reception processing of a downlink signal in the same subframe.

Figure 3D:
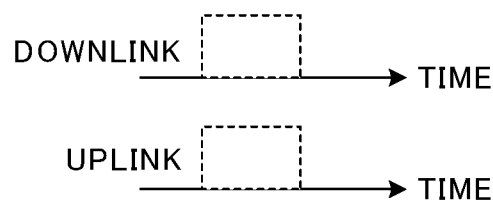

In a fourth pattern as shown in FIG. 3D, the mobile terminal apparatus performs neither transmission processing of an uplink signal nor reception processing of a downlink signal. For example, when the uplink signal and downlink signal are both important (priorities are the same), the mobile terminal apparatus regards as erroneous detection of signals, and halts transmission/reception processing of the downlink signal and uplink signal.

Described next is the priority relationship between uplink signals and downlink signals. FIG. 4 is a table showing an example of the priority relationship between uplink signals and downlink signals. In addition, the priority relationship and kinds of signals as shown in FIG. 4 are not limited thereto, and are capable of being modified as appropriate.

Herein, as uplink signals, exemplified are a PUSCH signal, Periodic CQI (Channel Quality Indicator), ACK (Acknowledgement)/NACK (Negative Acknowledgement), Positive SR (Scheduling Request), SRS (Sounding Reference Signal), and PRACH signal. The PUSCH signal is transmitted on a PUSCH (Physical Uplink Shared Channel) as an uplink data channel shared among a plurality of mobile terminals, and includes user data and control information of higher layer. The Periodic CQI is transmitted on a PUCCH (Physical Uplink Control Channel) as an uplink control channel, and is channel quality information of downlink required for scheduling of downlink user data and adaptive link control.

The ACK/NACK is response information to a PDSCH transmitted on the PUCCH. The Positive SR is transmitted on the PUCCH, and request information for requesting a base station apparatus to add to scheduling in order for the mobile terminal apparatus to transmit newly occurring data. The SRS is a reference signal used for measurement of a CQI of uplink for each frequency of the mobile terminal apparatus. The PRACH signal is transmitted on a PRACH (Physical Random Access Channel) as an access channel, and is a collision type signal for the mobile terminal apparatus to perform setting of a communication start and the like in initial access.

Further, herein, as downlink signals, exemplified are a PDSCH signal, PDCCH signal, PHICH signal, CSI-RS (Channel State Information-Reference Signal), and PBCH signal. The PDSCH signal is transmitted on a PDSCH (Physical Downlink Shared Channel) as a downlink data channel shared among mobile terminal apparatuses, and includes user data and control information of higher layer. The PDCCH signal is transmitted on a PDCCH (Physical Downlink Control Channel) as a downlink control channel, and includes scheduling information of the PUSCH and PDCCH by a scheduler and the like.

The PHICH signal is transmitted on a PHICH (Physical HARQ Indicator Channel) as a downlink control channel, and is ACK/NACK (response information) to the PUSCH. The CSI-RS is a reference signal used in CSI measurement for CQI, PMI (Precoding Matrix Indicator), RI (Rank Indicator) and the like as a channel state. The PBCH signal is transmitted on a PBCH (Physical Broadcast Channel) as a broadcast channel, and includes system-specific and cell-specific control information broadcasted to the entire cell.

The priority relationship between each uplink signal and each downlink signal described above will be described below. The priority relationship is set on both the mobile terminal apparatus and the base station apparatus, is used by the mobile terminal apparatus in selection of transmission/reception processing, and is used by the base station apparatus mainly in demodulation of an uplink signal from the mobile terminal apparatus.

As shown in FIG. 4, the priority of a PUSCH signal in uplink is defined to be the same as the priority of a PDSCH signal in downlink. Accordingly, when transmission timing of the PUSCH signal and reception timing of the PDSCH signal overlaps each other, the mobile terminal apparatus neither transmits nor receives any of the signals, and regards as erroneous detection of signals.

The priority of a PUSCH signal in uplink is defined to be higher than the priority of a PDSCH signal in downlink. Accordingly, when transmission timing of the PUSCH signal and reception timing of the PDCCH signal overlaps each other, the mobile terminal apparatus transmits the PUSCH signal. In addition, the mobile terminal apparatus may give a higher priority to reception of the PDCCH signal than transmission of the PUSCH signal in a particular subframe. The particular subframe may be notified semi-statically from the base station apparatus to the mobile terminal apparatus by RRC signaling or the like, or may be notified dynamically from the base station apparatus to the mobile terminal apparatus by adding a control bit of the PDCCH signal.

The priority of a PUSCH signal in uplink is defined to be lower than the priority of a PHICH signal in downlink. Accordingly, when transmission timing of the PUSCH signal and reception timing of the PHICH signal overlaps each other, the mobile terminal apparatus receives the PHICH signal.

The priority of a PUSCH signal in uplink is defined to be higher than the priority of a CSI-RS in downlink. Accordingly, when transmission timing of the PUSCH signal and reception timing of the CSI-RS overlaps each other, the mobile terminal apparatus transmits the PUSCH signal.

The priority of a PUSCH signal in uplink is defined to be higher than the priority of a PBCH signal in downlink. Accordingly, when transmission timing of the PUSCH signal and reception timing of the PBCH signal overlaps each other, the mobile terminal apparatus transmits the PUSCH signal. In addition, the mobile terminal apparatus may give a higher priority to reception of the PBCH signal than transmission of the PUSCH signal in a particular subframe. The particular subframe may be notified by RRC signaling or the like, or may be notified by adding a control bit of the PDCCH signal.

The priority of a Periodic CQI in uplink is defined to be higher than the priority of a PDSCH signal in downlink. Accordingly, when transmission timing of the Periodic CQI and reception timing of the PDSCH signal overlaps each other, the mobile terminal apparatus transmits the Periodic CQI.

The priority of a Periodic CQI in uplink is defined to be higher than the priority of a PDCCH signal in downlink. Accordingly, when transmission timing of the Periodic CQI and reception timing of the PDCCH signal overlaps each other, the mobile terminal apparatus transmits the Periodic CQI. In addition, the mobile terminal apparatus may perform transmission of the Periodic CQI and reception of the PDCCH signal in the same subframe, using a PUCCH format for HD-FDD. The PUCCH format for HD-FDD will specifically be described later.

The priority of a Periodic CQI in uplink is defined to be lower than the priority of a PHICH signal in downlink. Accordingly, when transmission timing of the Periodic CQI and reception timing of the PHICH signal overlaps each other, the mobile terminal apparatus receives the PHICH. In addition, the mobile terminal apparatus may perform transmission of the Periodic CQI and reception of the PHICH signal in the same subframe, using the PUCCH format for HD-FDD.

The priority of a Periodic CQI in uplink is defined to be higher than the priority of a CSI-RS in downlink. Accordingly, when transmission timing of the Periodic CQI and reception timing of the CSI-RS overlaps each other, the mobile terminal apparatus transmits the Periodic CQI. In addition, the mobile terminal apparatus may give a higher priority to reception of the CSI-RS than transmission of the Periodic CQI in a particular subframe. The particular subframe may be notified by RRC signaling or the like, or may be notified by adding a control bit to the PDCCH signal.

The priority of a Periodic CQI in uplink is defined to be higher than the priority of a PBCH signal in downlink. Accordingly, when transmission timing of the Periodic CQI and reception timing of the PBCH signal overlaps each other, the mobile terminal apparatus transmits the Periodic CQI. In addition, the mobile terminal apparatus may give a higher priority to reception of the PBCH signal than transmission of the Periodic CQI in a particular subframe. The particular subframe may be notified by RRC signaling or the like, or may be notified by adding a control bit to the PDCCH signal.

The priority of ACK/NACK in uplink is defined to be higher than the priority of a PDSCH signal in downlink. Accordingly, when transmission timing of ACK/NACK and reception timing of the PDSCH signal overlaps each other, the mobile terminal apparatus transmits ACK/NACK.

The priority of ACK/NACK in uplink is defined to be higher than the priority of a PDCCH signal in downlink. Accordingly, when transmission timing of ACK/NACK and reception timing of the PDCCH signal overlaps each other, the mobile terminal apparatus transmits ACK/NACK. In addition, the mobile terminal apparatus may perform transmission of ACK/NACK and reception of the PDCCH signal in the same subframe, using the PUCCH format for HD-FDD.

The priority of ACK/NACK in uplink is defined to be the same as the priority of a PHICH signal in downlink. Accordingly, when transmission timing of ACK/NACK and reception timing of the PHICH signal overlaps each other, the mobile terminal apparatus neither transmits nor receives any of the signals, and regards as erroneous detection of signals.

The priority of ACK/NACK in uplink is defined to be higher than the priority of a CSI-RS in downlink. Accordingly, when transmission timing of ACK/NACK and reception timing of the CSI-RS overlaps each other, the mobile terminal apparatus transmits ACK/NACK.

The priority of ACK/NACK in uplink is defined to be higher than the priority of a PBCH signal in downlink. Accordingly, when transmission timing of ACK/NACK and reception timing of the PBCH signal overlaps each other, the mobile terminal apparatus transmits ACK/NACK.

The priority of a Positive SR in uplink is defined to be lower than the priority of a PDSCH signal in downlink. Accordingly, when transmission timing of the Positive SR and reception timing of the PDSCH signal overlaps each other, the mobile terminal apparatus receives the PDSCH signal.

The priority of a Positive SR in uplink is defined to be higher than the priority of a PDCCH signal in downlink. Accordingly, when transmission timing of the Positive SR and reception timing of the PDCCH signal overlaps each other, the mobile terminal apparatus transmits the Positive SR. In addition, the mobile terminal apparatus may perform transmission of the Positive SR and reception of the PDCCH signal in the same subframe, using the PUCCH format for HD-FDD.

The priority of a Positive SR in uplink is defined to be lower than the priority of a PHICH signal in downlink. Accordingly, when transmission timing of the Positive SR and reception timing of the PHICH signal overlaps each other, the mobile terminal apparatus receives the PHICH signal. In addition, the mobile terminal apparatus may perform transmission of the Positive SR and reception of the PHICH signal in the same subframe, using the PUCCH format for HD-FDD.

The priority of a Positive SR in uplink is defined to be higher than the priority of a CSI-RS in downlink. Accordingly, when transmission timing of the Positive SR and reception timing of the CSI-RS overlaps each other, the mobile terminal apparatus transmits the Positive SR.

The priority of a Positive SR in uplink is defined to be higher than the priority of a PBCH signal in downlink. Accordingly, when transmission timing of the Positive SR and reception timing of the PBCH signal overlaps each other, the mobile terminal apparatus transmits the Positive SR. In addition, the mobile terminal apparatus may give a higher priority to reception of the PBCH signal than transmission of the Positive SR in a particular subframe. The particular subframe may be notified by RRC signaling or the like, or may be notified by adding a control bit to the PDCCH signal.

The priority of an SRS in uplink is defined to be higher than the priority of a PDSCH signal in downlink. Accordingly, when transmission timing of the SRS and reception timing of the PDSCH signal overlaps each other, the mobile terminal apparatus transmits the SRS. In addition, details will be described later, the base station apparatus may transmit the SRS in uplink after receiving the PDSCH signal up to some point in downlink.

An SRS in uplink is assigned to a different symbol from that of a PDCCH signal in downlink in the same subframe. Accordingly, transmission of the SRS and reception of the PDCCH is performed in the same subframe. In addition, priories may be defined or may not be defined between an SRS and a PDCCH signal.

An SRS in uplink is assigned to a different symbol from that of a PHICH signal in downlink in the same subframe. Accordingly, transmission of the SRS and reception of the PHICH is performed in the same subframe. In addition, priories may be defined or may not be defined between an SRS and a PHICH signal.

When an SRS in uplink is assigned to a different symbol from that of a CSI-RS in downlink in the same subframe, transmission of the SRS and reception of the CSI-RS is performed in the same subframe. In this case, priories may be defined or may not be defined between an SRS and a CSI-RS. Meanwhile, when an SRS is assigned to the same symbol as that of a CSI-RS in the same subframe, one of priorities of the SRS and CSI-RS is defined to be higher. By this means, priority is given to processing of a signal of a higher priority between the SRS and the CSI-RS.

An SRS in uplink is assigned to a different symbol from that of a PBCH signal in downlink in the same subframe. Accordingly, transmission of the SRS and reception of the PBCH signal is performed in the same subframe. In addition, priories may be defined or may not be defined between an SRS and a PBCH signal.

The priority of a PRACH signal in uplink is defined to be lower than the priority of a PDSCH signal in downlink. Accordingly, when transmission timing of the PRACH signal and reception timing of the PDSCH signal overlaps each other, the mobile terminal apparatus receives the PDSCH signal.

The priority of a PRACH signal in uplink is defined to be higher than the priority of a PDCCH signal in downlink. Accordingly, when transmission timing of the PRACH signal and reception timing of the PDCCH signal overlaps each other, the mobile terminal apparatus transmits the PRACH signal. In addition, the mobile terminal apparatus may perform transmission of the PRACH signal and reception of the PDCCH signal in the same subframe, using a PRACH format for HD-FDD.

The priority of a PRACH signal in uplink is defined to be lower than the priority of a PHICH signal in downlink. Accordingly, when transmission timing of the PRACH signal and reception timing of the PHICH signal overlaps each other, the mobile terminal apparatus receives the PHICH signal. In addition, the mobile terminal apparatus may perform transmission of the PRACH signal and reception of the PHICH signal in the same subframe, using the PRACH format for HD-FDD.

The priority of a PRACH signal in uplink is defined to be higher than the priority of a CSI-RS in downlink. Accordingly, when transmission timing of the PRACH signal and reception timing of the CSI-RS overlaps each other, the mobile terminal apparatus transmits the PRACH signal.

The priority of a PRACH signal in uplink is defined to be higher than the priority of a PBCH signal in downlink. Accordingly, when transmission timing of the PRACH signal and reception timing of the PBCH signal overlaps each other, the mobile terminal apparatus transmits the PRACH signal. In addition, the mobile terminal apparatus may give a higher priority to reception of the PBCH signal than transmission of the PRACH signal in a particular subframe. The particular subframe may be notified by RRC signaling or the like, or may be notified by adding a control bit of the PDCCH signal.

By thus defining the priority relationship between an uplink signal and a downlink signal, even when transmission timing of the uplink signal and reception timing of the downlink signal overlaps each other, it is possible to cause the mobile terminal apparatus to perform transmission/reception processing of an important signal with reliability. In addition, the priority relationship as described above is defined while giving a higher priority mainly to an uplink signal than a downlink signal, but is not limited thereto. The priority relationship is capable of being modified as appropriate corresponding to the network configuration, base station apparatus configuration, mobile terminal apparatus configuration and the like.

Transmission/reception methods of uplink signal and downlink signal in the same subframe as described above will specifically be described with reference to FIG. 5. FIG. 5 contains explanatory views of transmission/reception methods of uplink signal and downlink signal in the same subframe.

Figure 5A:
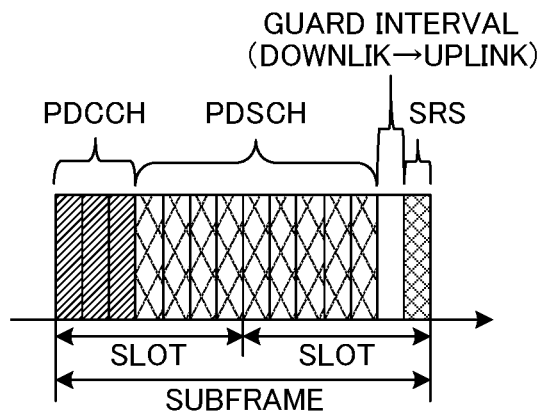
FIGS. 5A-5C contain explanatory views of transmission/reception methods of uplink signal and downlink signal in the same subframe.

A first transmission/reception method as shown in FIG. 5A is a transmission/reception method in which a mobile terminal apparatus receives a downlink signal up to some point in a subframe, and then, transmits an uplink signal in remaining symbols. Herein, the description is given by exemplifying a PDCCH signal and PDSCH signal as downlink signals, and an SRS as an uplink signal, but is not limited to these signals, and it is possible to modify as appropriate.

Generally, an uplink SRS is assigned to a different symbol from that of a downlink PDCCH signal in the same subframe, but overlaps a symbol assigned to part of a downlink PDSCH signal. Therefore, as shown in FIG. 5A, the mobile terminal apparatus ignores last several symbols (2 symbols in this Embodiment) of the PDSCH signal for the SRS. The mobile terminal apparatus receives the PDCCH signal of first 3 symbols from the base station apparatus, while receiving the PDSCH signal up to symbols two-symbol-before the last symbol. Subsequently, the mobile terminal apparatus uses a symbol immediately before the last symbol as a guard interval to switch from the downlink reception processing to the uplink transmission processing, and transmits the SRS to the base station apparatus in the last symbol.

Further, the base station apparatus may perform rate matching processing or puncturing processing on a PDSCH signal to transmit the PDSCH signal with two symbols being vacant corresponding to an SRS and guard interval reserved in a single subframe. In this case, the base station apparatus performs the rate matching processing or the like of the PDSCH signal based on the priority relationship defined between the uplink signal and the downlink signal. The mobile terminal apparatus receives the PDCCH signal and PDSCH signal from the base station apparatus. Subsequently, the mobile terminal apparatus uses a symbol immediately before the last symbol as a guard interval to switch from the downlink reception processing to the uplink transmission processing, and transmits the SRS to the base station apparatus in the last symbol reserved for the SRS.

In addition, in the above-mentioned first transmission/reception method, the downlink signal is received up to some point, and then, the uplink signal is received in the remaining symbols. Alternatively, the uplink signal may be transmitted up to some point, and then, the downlink signal may be received in the remaining symbols. Further, in FIG. 5A, it is preferable that last two symbols of the PDSCH signal are not assigned important data.

Figure 5B:
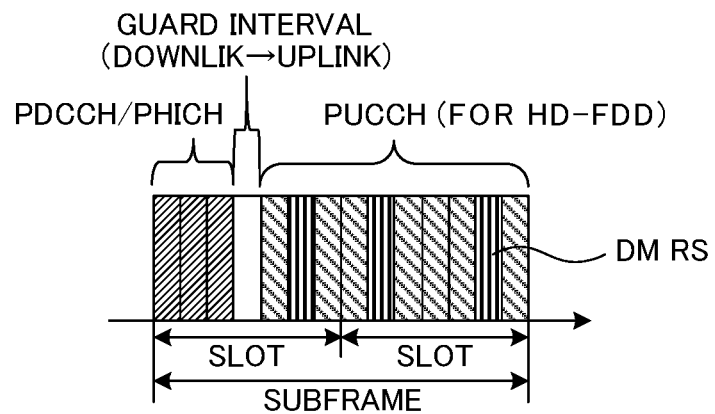
Figure 5C:
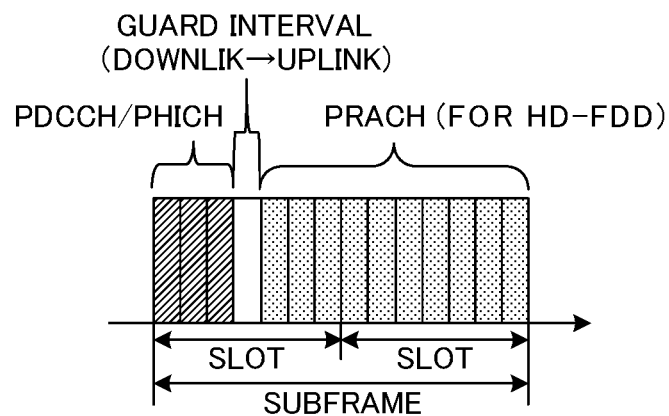

A second transmission/reception method as shown in FIGS. 5B and 5C is a transmission/reception method for performing transmission of an uplink signal and reception of a downlink signal in the same subframe, using a signal format for HD-FDD in a single subframe. Herein, the description is given by exemplifying a PDCCH signal and PHICH signal that are downlink L1/L2 control signals as downlink signals, and a PUCCH signal and PRACH signal as uplink signals, but is not limited to these signals, and it is possible to modify as appropriate.

Generally, a PUCCH signal in uplink is as signed to the entire subframe, and therefore, overlaps symbols assigned to a PDCCH signal and PHICH signal in downlink in the same subframe. Therefore, as shown in FIG. 5B, the mobile terminal apparatus uses a PUCCH format for HD-FDD in which first several symbols (4 symbols in this Embodiment) of a PUCCH are punctured or undergo rate matching so as to avoid a PDCCH signal and PHICH signal. The mobile terminal apparatus receives the PDCCH signal and PHICH signal from the base station apparatus in first 3 symbols of the PUCCH format for HD-FDD undergoing puncturing or the like. Subsequently, the mobile terminal apparatus uses a 4th symbol of the PUCCH format for HD-FDD as a guard interval to switch from the downlink reception processing to the uplink transmission processing, and transmits the PUCCH signal to the base station apparatus in the remaining symbols.

Further, generally, a PRACH signal in uplink is assigned to the entire subframe, and therefore, overlaps symbols assigned to a PDCCH signal and PHICH signal in downlink in the same subframe. Therefore, as shown in FIG. 5C, the mobile terminal apparatus uses a PRACH format for HD-FDD in which first several symbols (4 symbols in this Embodiment) of a PRACH are punctured so as to avoid a PDCCH signal and PHICH signal. The mobile terminal apparatus receives the PDCCH signal and PHICH signal from the base station apparatus in first 3 symbols of the PRACH format for HD-FDD undergoing puncturing. Subsequently, the mobile terminal apparatus uses a 4th symbol of the PRACH format for HD-FDD as a guard interval to switch from the downlink reception processing to the uplink transmission processing, and transmits the PRACH signal to the base station apparatus in the remaining symbols.

Moreover, the base station apparatus may use an uplink signal format for HD-FDD in which a part of symbols of an uplink signal undergoes puncturing or rate matching so as to avoid a downlink signal. The mobile terminal apparatus receives a PUSCH signal of a part of the uplink signal format, while transmitting an uplink signal in the remaining symbols.

In addition, in the above-mentioned second transmission/reception method, a signal format for HD-FDD may be used with first several symbols being vacant, or a signal format for HD-FDD may be used with last several symbols being vacant or middle several symbols being vacant. Further, an uplink signal format and downlink signal format may be combined to use.

Moreover, the transmission/reception method of uplink signal and downlink signal in the same subframe is not limited to the first transmission/reception method and the second transmission/reception method. Any method is capable of being used, as long as the method enables the mobile terminal apparatus to perform transmission processing of an uplink signal and reception processing of a downlink signal in the same subframe.

Figure 6:
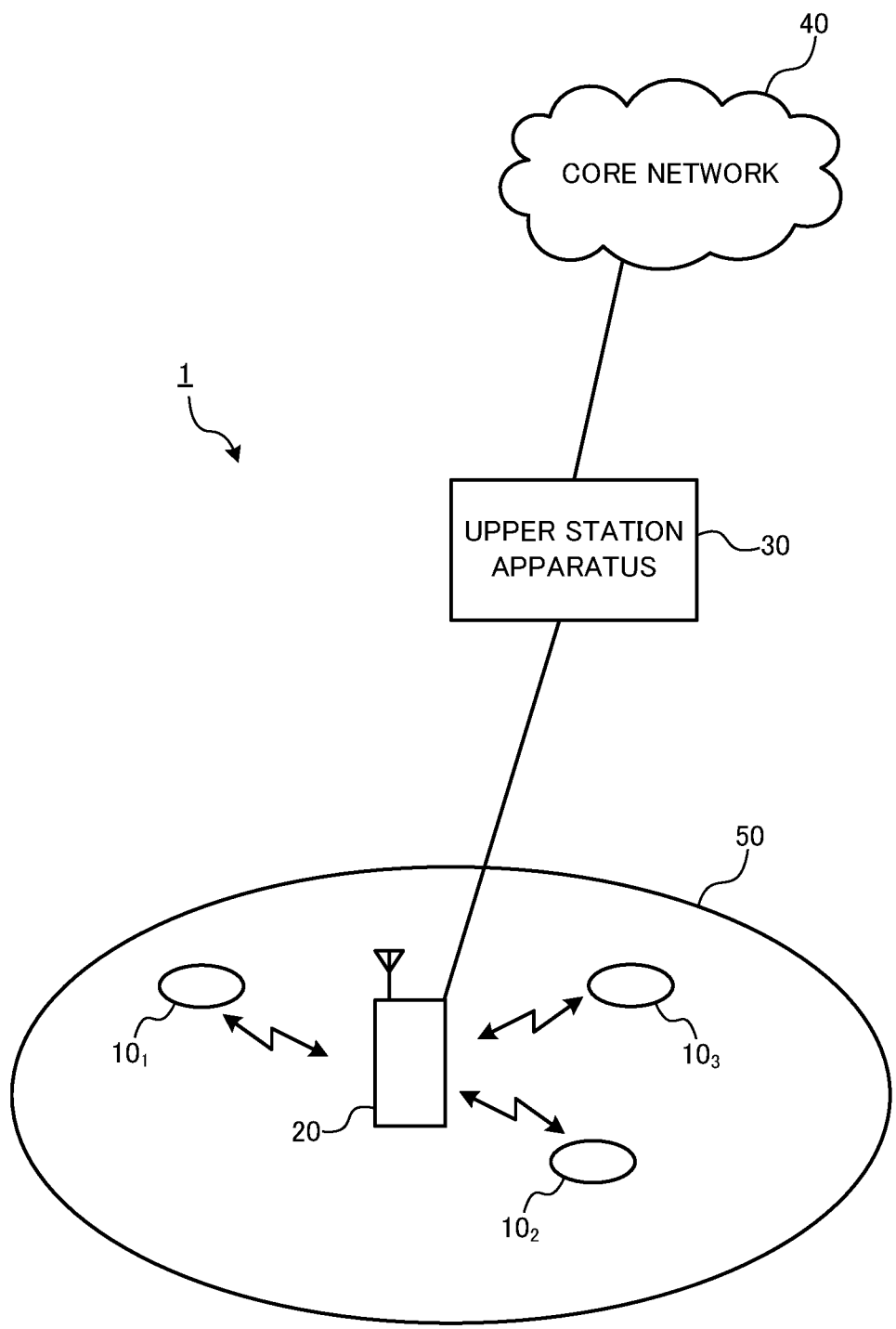
FIG. 6 is an explanatory view of a system configuration of a radio communication system.

A radio communication system according to the Embodiment of the invention will specifically be described herein. FIG. 6 is an explanatory view of a system configuration of the radio communication system according to this Embodiment. In addition, the radio communication system as shown in FIG. 6 is a system including the LTE system or SUPER 3G, for example. Further, the radio communication system may be called IMT-Advanced or may be called 4G.

As shown in FIG. 6, the radio communication system 1 includes the base station apparatus 20, and a plurality of mobile terminal apparatuses 10 ($10_1$, $10_2$, $10_3$, . . . , $10_n$, n is an integer where n>0) that communicate with the base station apparatus 20 and is comprised thereof. The base station apparatus 20 is connected to an upper station apparatus 30, and the upper station apparatus 30 is connected to a core network 40. The mobile terminal apparatuses 10 are capable of communicating with the base station apparatus 20 in a cell 50. In addition, for example, the upper station apparatus 30 includes an access gateway apparatus, radio network controller (RNC), mobility management entity (MME), etc., but is not limited thereto.

Each of the mobile terminal apparatuses ($10_1$, $10_2$, $10_3$, . . . , $10_n$) includes an LTE terminal and LTE-A terminal, and is described as a mobile terminal apparatus 10 unless otherwise specified in the following description. Further, for convenience in description, the description is given while assuming that equipment that performs radio communications with the base station apparatus 20 is the mobile terminal apparatus 10, and more generally, the equipment may be user equipment (UE) including mobile terminal apparatuses and fixed terminal apparatuses.

In the radio communication system 1, as a radio access scheme, OFDMA (Orthogonal Frequency Division Multiple Access) is applied in downlink, while SC-FDMA (Single-Carrier Frequency Division Multiple Access) is applied in uplink, but the uplink radio access scheme is not limited thereto. OFDMA is a multicarrier transmission scheme for dividing a frequency band into a plurality of narrow frequency bands (subcarriers), and mapping data to each subcarrier to perform communications. SC-FDMA is a single-carrier transmission scheme for dividing the system band into bands comprised of a single or consecutive resource blocks for each terminal so that a plurality of terminals uses mutually different bands, and thereby reducing interference among the terminals.

Figure 7:
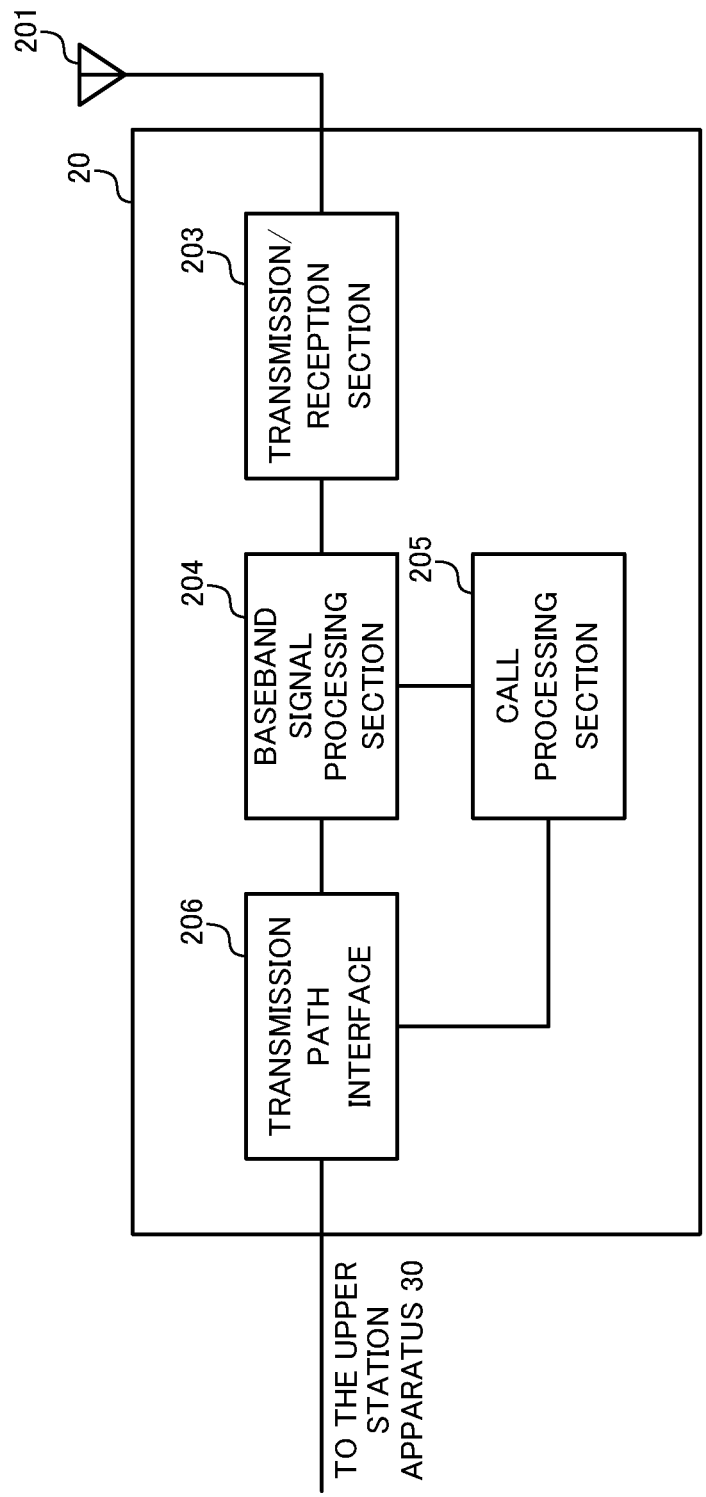
FIG. 7 is an entire configuration diagram of a base station apparatus.

Referring to FIG. 7, described is the entire configuration of the base station apparatus 20 according to this Embodiment. The base station apparatus 20 is provided with a transmission/reception antenna 201, transmission/reception section 203, baseband signal processing sect ion 204, call processing section 205 and transmission path interface 206. The user data to transmit from the base station apparatus 20 to the mobile terminal apparatus 10 in downlink is input to the baseband signal processing section 204 via the transmission path interface 206 from the upper station apparatus 30.

The baseband signal processing section 204 performs PDCP layer processing, segmentation and concatenation of the user data, RLC (Radio Link Control) layer transmission processing such as transmission processing of RLC retransmission control, MAC (Medium Access Control) retransmission control e.g. HARQ transmission processing, scheduling, transmission format selection, channel coding, Inverse Fast Fourier Transform processing and precoding processing. Further, on a signal of the Physical Downlink Control Channel that is a downlink control channel, the section 204 also performs transmission processing of channel coding, Inverse Fast Fourier Transform and the like.

Further, the baseband signal processing section 204 notifies the mobile terminal apparatus 10 of control information for communications in the cell on the broadcast channel. For example, the control information includes the system bandwidth in uplink or downlink, identification information (Root Sequence Index) of a root sequence to generate a signal of a random access preamble on the PRACH, etc.

The transmission/reception section 203 converts the frequency of the baseband signal output from the baseband signal processing section 204 into a radio frequency band, and amplifies the signal to output to the transmission/reception antenna 201.

Meanwhile, with respect to signals transmitted from the mobile terminal apparatus 10 to the base station apparatus 20 in uplink, a radio frequency signal received in the transmission/reception antenna 201 is amplified in the transmission/reception section 203, while being converted into a baseband signal, and is input to the baseband signal processing section 204.

The baseband signal processing section 204 performs FFT processing, IDFT processing, error correcting decoding, reception processing of MAC retransmission control, and reception processing of RLC layer and PDCP layer on the user data included in the baseband signal received in uplink. The decoded signal is transferred to the upper station apparatus 30 via the transmission path interface 206.

The call processing section 205 performs call processing such as setting and release of the communication channel, status management of the base station apparatus 20, and management of radio resources.

Figure 8:
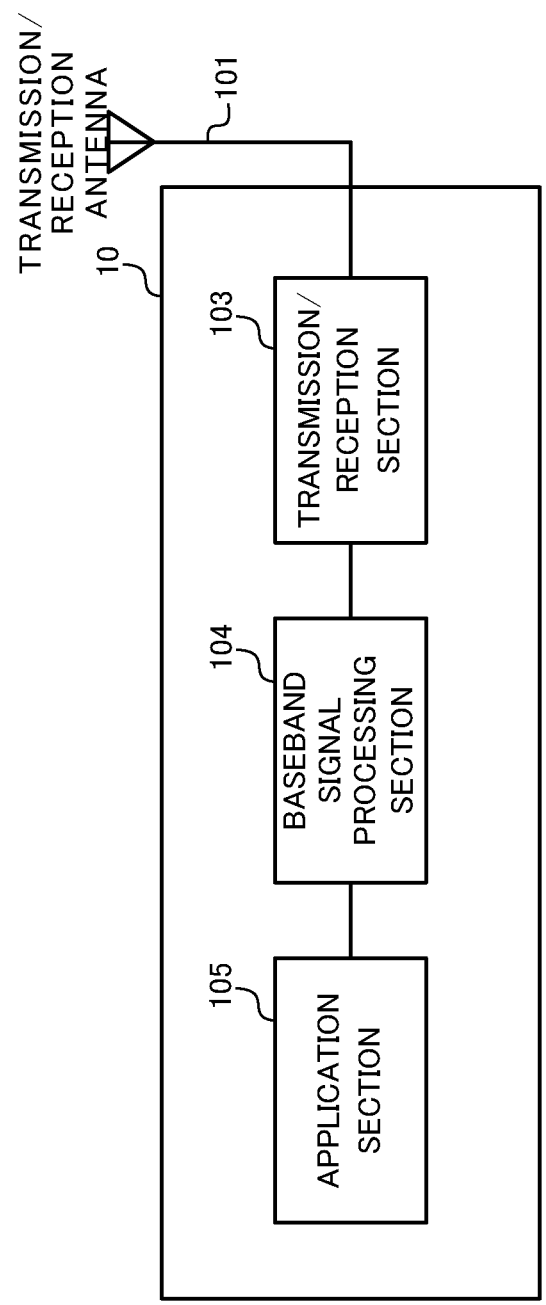
FIG. 8 is an entire configuration diagram of the mobile terminal apparatus.

Referring to FIG. 8, described next is the entire configuration of the mobile terminal apparatus 10 according to this Embodiment. The LTE terminal and the LTE-A terminal have the same configuration of principal part of hardware, and are not distinguished to describe. The mobile terminal apparatus 10 is provided with a transmission/reception antenna 101, transmission/reception section 103, baseband signal processing section 104 and application section 105.

With respect to data in downlink, a radio frequency signal received in the transmission/reception antenna 101 is amplified in the transmission/reception section 103, while being subjected to frequency conversion, and is converted into a baseband signal. The baseband signal is subjected to FFT processing, error correcting decoding, reception processing of retransmission control, etc. in the baseband signal processing section 104. Among the data in downlink, the user data in downlink is transferred to the application section 105. The application section 105 performs processing concerning layers higher than the physical layer and MAC layer and the like. Further, among the data in downlink, the broadcast information is also transferred to the application section 105.

Meanwhile, with respect to user data in uplink, the application section 105 inputs the data to the baseband signal processing section 104. The baseband signal processing section 104 performs transmission processing of retransmission control (HARQ), channel coding, DFT processing and IFFT processing. The transmission/reception section 103 converts the frequency of the baseband signal output from the baseband signal processing section 104 into a radio frequency band, and amplifies the signal to output to the transmission/reception antenna 101.

Figure 9:
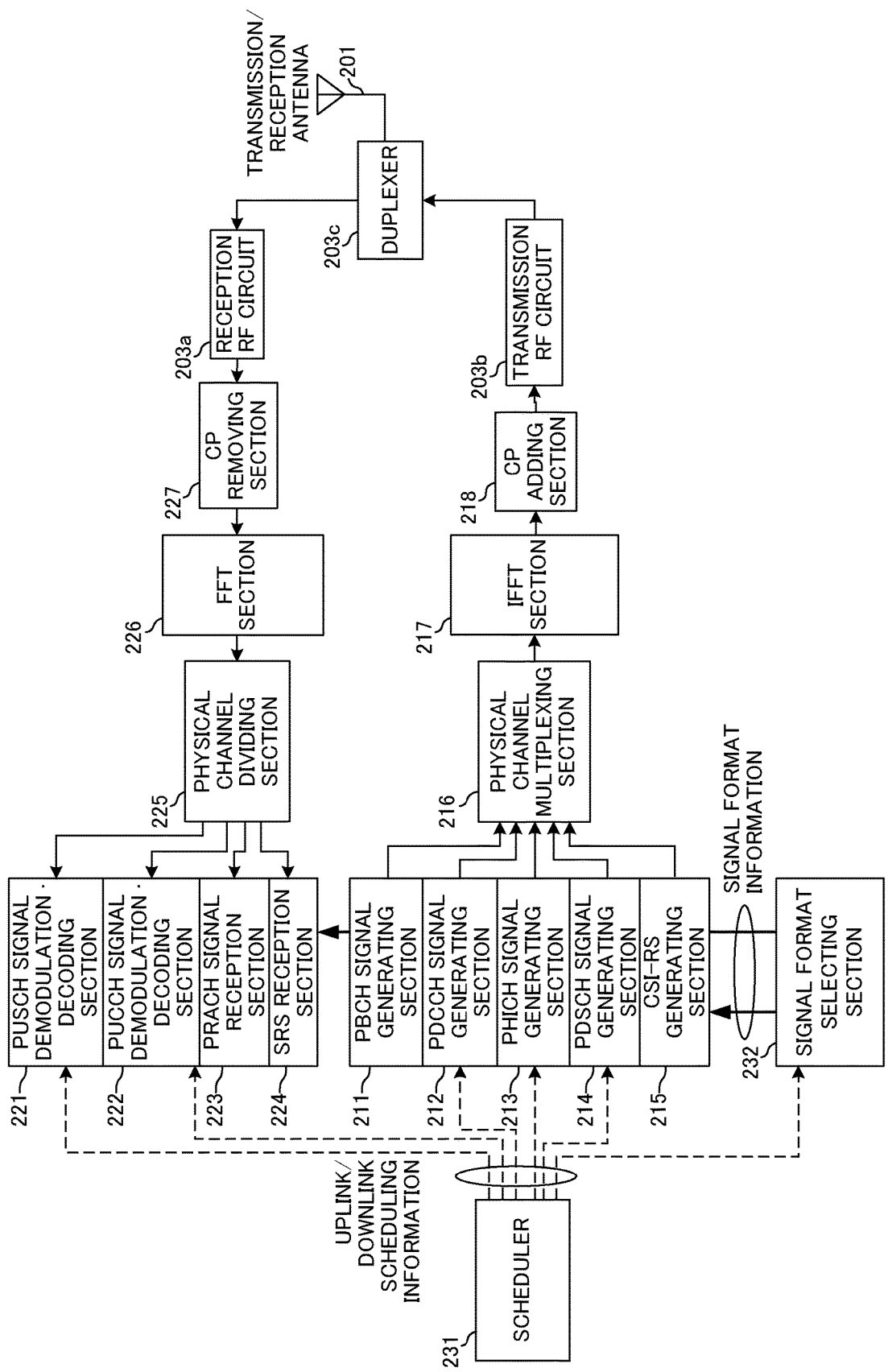
FIG. 9 is a functional block diagram of the base station apparatus.

Functional blocks of the base station apparatus according to this Embodiment will be described with reference to FIG. 9. In addition, FIG. 9 mainly shows functional blocks of the baseband processing section and transmission/reception section. Further, FIG. 9 simplifies the baseband processing section and transmission/reception section, and it is assumed to have configurations generally provided in the baseband processing section and transmission/reception section. The base station apparatus 20 has a PBCH signal generating section 211, PDCCH signal generating section 212, PHICH signal generating section 213, PDSCH signal generating section 214, CSI-RS generating section 215, physical channel multiplexing section 216, IFFT section 217, CP adding section 218, and transmission RF circuit 203b, as a transmission system.

The PBCH signal generating section 211 generates a PBCH signal including basic parameters of a bandwidth, control channel configuration, etc. The PDCCH signal generating section 212 generates a PDCCH signal including format information such as a modulation method and coding rate, in addition to scheduling information of the PUSCH signal and PDSCH signal, for each user, based on allocation by a scheduler 231. The PHICH signal generating section 213 generates a PHICH signal for HARQ (Hybrid Automatic Repeat reQuest) to the PUSCH signal based on allocation by the scheduler 231. The PDSCH signal generating section 214 generates a PDSCH signal including user data and control information of a higher layer shared by a plurality of mobile terminal apparatuses 10, based on allocation by the scheduler 231. The CSI-RS generating section 215 generates a CSI-RS used only for measurement of channel state information.

The physical channel multiplexing section 216 multiplexes downlink signals which are coded and modulated in respective signal generating sections to input to the IFFT section 217. The IFFT section 217 performs IFFT (Inverse Fast Fourier Transform) on the multiplexed downlink signal, and transforms the signal in the frequency domain into a time-series signal. The CP adding section 218 inserts a cyclic prefix in the downlink signal. Then, the downlink signal passes through the transmission RF circuit 203b, and is transmitted from the transmission/reception antenna 201 via a duplexer 203c provided in between the transmission system and a reception system.

As the reception system, the base station apparatus 20 has a PUSCH signal demodulation • decoding section 221, PUCCH signal demodulation • decoding section 222, PRACH signal reception section 223, SRS reception section 224, physical channel dividing section 225, FFT section 226, CP removing section 227 and reception RF circuit 203a. An uplink signal received in the transmission/reception antenna 201 is input to the CP removing section 227 via the duplexer 203c and reception RF circuit 203a. The CP removing section 227 removes the cyclic prefix from the uplink signal to input to the FFT section 226. The FFT section 226 performs Fast Fourier Transform (FFT) on the uplink signal, and transforms the time-series signal into a signal in the frequency domain to input to the physical channel dividing section 225. The physical channel dividing section 225 divides uplink signals multiplexed into the uplink signal into respective signals.

The PUSCH signal demodulation • decoding section 221 demodulates a PUSCH signal including user data and control information of a higher layer shared by a plurality of mobile terminal apparatuses 10, based on allocation by the scheduler 231, and further decodes the signal. The PUCCH signal demodulation • decoding section 222 demodulates a PUCCH signal including a Periodic CQI, ACK/NACK to the PDSCH and Positive SR, based on allocation of the scheduler 231, and further decodes the signal. The PRACH signal reception section 223 receives a collision type PRACH signal used in initial access of the mobile terminal apparatus 10. The SRS reception section 224 receives an SRS to perform scheduling by the scheduler 231 and adaptive control.

The scheduler 231 controls resource allocation to mobile terminal apparatuses 10 under the base station apparatus corresponding to communication quality of the entire system band. The scheduler 231 distinguishes between an LTE terminal user and an LTE-A terminal user to perform scheduling. To the scheduler 231 are input transmission data and retransmission instructions from the upper station apparatus 30, and a channel estimation value and CQI of a resource block from the reception section that measures the uplink signal. The scheduler 231 performs scheduling of the PDCCH signal, PHICH signal and PDSCH signal, while referring to the retransmission instructions input from the upper station apparatus 30, channel estimation value and CQI. In a propagation path in mobile communications, variations vary with frequencies by frequency selective fading. Then, in transmitting user data to mobile terminal apparatuses 10, the scheduler 231 allocates resource blocks with good communication quality for each subframe to each mobile terminal apparatus 10 (called adaptive frequency scheduling). In adaptive frequency scheduling, a mobile terminal apparatus 10 of good propagation path quality is selected and allocated for each resource block. Therefore, the scheduler 231 uses CQIs on a basis of a resource block transmitted from each mobile terminal apparatus 10 as feedback to allocate resource blocks. Further, the scheduler 231 determines an MCS (coding rate, modulation scheme) meeting a predetermined block error rate in the allocated resource block. A parameter satisfying the MCS determined in the scheduler 231 is set on the PDCCH signal generating section 212, PHICH signal generating section 213 and PDSCH signal generating section 214.

Further, the scheduler 231 controls demodulation and decoding of the PUSCH signal demodulation • decoding section 221 and PUCCH signal demodulation • decoding section 222, in consideration of the above-mentioned priority relationship. When transmission and reception timing of uplink and downlink signals in the mobile terminal apparatus 10 overlaps each other, the PUSCH signal demodulation

• decoding section 221 and PUCCH signal demodulation • decoding section 222 need to determine whether the uplink signal is transmitted to the base station apparatus 20. Therefore, the scheduler 231 inputs, to the PUSCH signal demodulation • decoding section 221 and PUCCH signal demodulation • decoding section 222, which transmission of the uplink signal or reception of the downlink signal is given a higher priority in the mobile terminal apparatus 10 in a predetermined subframe based on the above-mentioned priority relationship.

Furthermore, the base station apparatus 20 has a signal format selecting section 232. When uplink and downlink signals are received and transmitted in the same subframe, the signal format selecting section 232 selects the signal format as shown in FIGS. 5A to 5C, based on allocation by the scheduler 231. When the transmission/reception method in the same subframe is controlled on the base station apparatus 20 side, the signal format selecting section 232 inputs signal format information to the signal generating sections. For example, based on the signal format information, on the premise that the mobile terminal apparatus 10 does not receive last several symbols of the subframe as shown in FIG. 5A, the PDSCH signal generating section 214 may perform rate matching processing or puncturing processing on the PDSCH signal. Further, for example, the PDSCH signal generating section 214 may generate the PDSCH format for HD-FDD in which the PDSCH signal undergoes rate matching or puncturing so as to avoid the downlink signal, based on the signal format information.

Meanwhile, when the transmission/reception method in the same subframe is controlled on the mobile terminal apparatus 10 side, the signal format selecting section inputs the signal format information to the demodulation • decoding sections and reception sections. By this means, even when transmission and reception timing of downlink and uplink signals overlaps each other in the same subframe, the demodulation • decoding sections and reception sections are capable of recognizing symbols in which an uplink signal is transmitted. For example, the PUCCH signal demodulation • decoding section 222 recognizes symbols assigned a PUCCH signal in a single subframe based on the signal format information, demodulates the PUCCH signal, and further decodes the signal.

Figure 10:
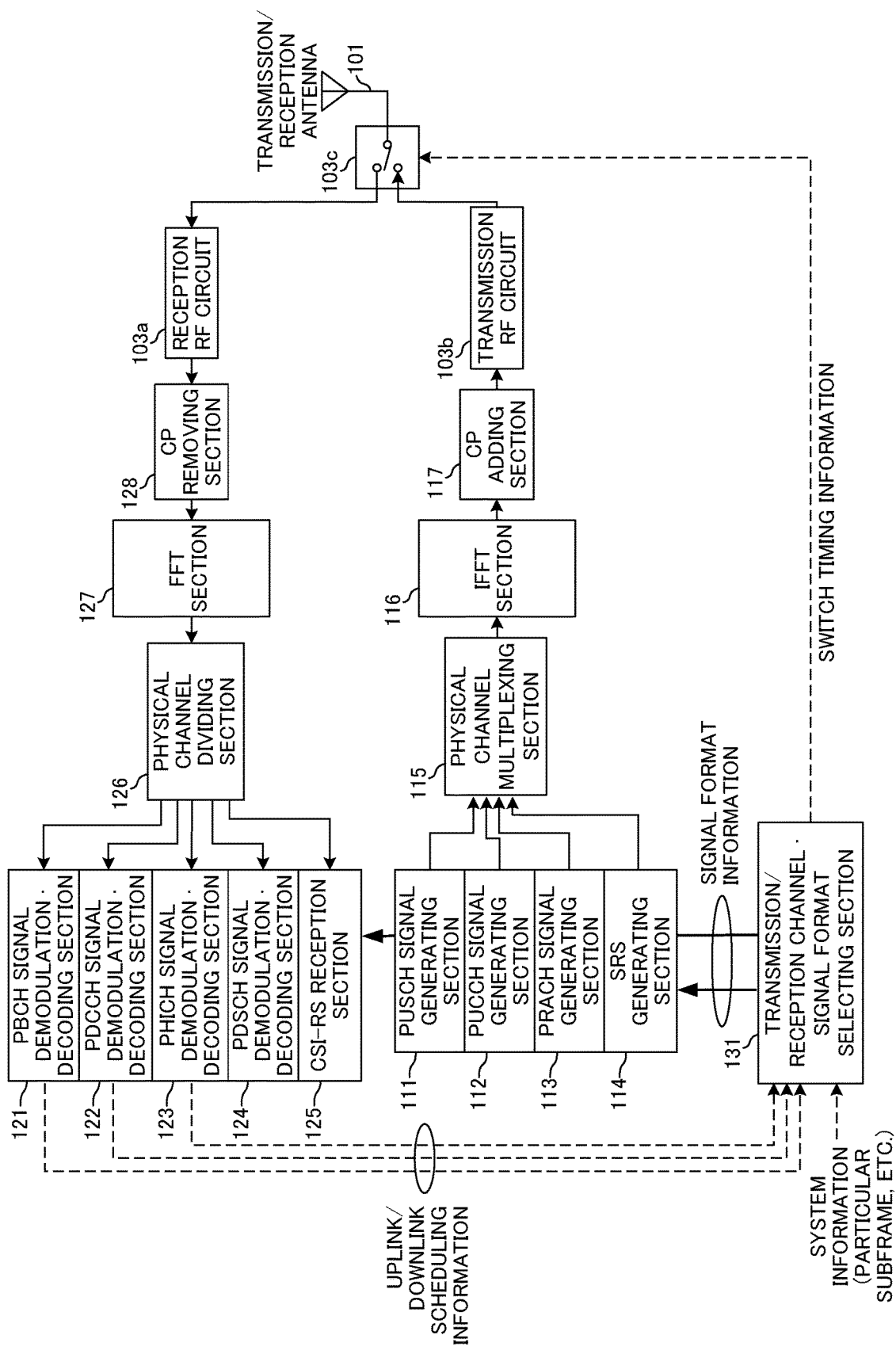
FIG. 10 is a functional block diagram of the mobile terminal apparatus.

Functional blocks of the mobile terminal apparatus according to this Embodiment will be described with reference to FIG. 10. In addition, FIG. 10 mainly shows functional blocks of the baseband processing section and transmission/reception section. Further, FIG. 10 simplifies the baseband processing section and transmission/reception section, and it is assumed to have configurations generally provided in the baseband processing section and transmission/reception section. The mobile terminal apparatus 10 has a PUSCH signal generating section 111, PUCCH signal generating section 112, PRACH signal generating section 113, SRS generating section 114, physical channel multiplexing section 115, IFFT section 116, CP adding section 117, and transmission RF circuit 103b, as a transmission system.

The PUSCH signal generating section 111 generates a PUSCH signal shared among a plurality of mobile terminal apparatuses 10 based on scheduling information. The PUCCH signal generating section 112 generates a PUCCH signal including a Periodic CQI, ACK/NACK, and Positive SR. The PRACH signal generating section 113 generates a collision type PRACH signal used in initial access to the base station apparatus 20. The SRS generating section 114 generates an SRS used in scheduling and adaptive control.

The physical channel multiplexing section 115 multiplexes uplink signals which are coded and modulated in respective signal generating sections to input to the IFFT section 116. The IFFT section 116 performs IFFT (Inverse Fast Fourier Transform) on the multiplexed uplink signal, and transforms the signal in the frequency domain into a time-series signal. The CP adding section 117 inserts a cyclic prefix in the uplink signal. Then, the uplink signal passes through the transmission RF circuit 103b, and is transmitted from the transmission/reception antenna 101 via a switch 103c provided in between the transmission system and a reception system.

As the reception system, the base station apparatus 20 has a PBCH signal demodulation • decoding section 121, PDCCH signal demodulation • decoding section 122, PHICH signal demodulation • decoding section 123, PDSCH signal demodulation • decoding section 124, CSI-RS reception section 125, physical channel dividing section 126, FFT section 127, CP removing section 128 and reception RF circuit 103a. A downlink signal received in the transmission/reception antenna 101 is input to the CP removing section 128 via the switch 103c and reception RF circuit 103a. The CP removing section 128 removes the cyclic prefix from the downlink signal to input to the FFT section 127. The FFT section 127 performs Fast Fourier Transform (FFT) on the downlink signal, and transforms the time-series signal into a signal in the frequency domain to input to the physical channel dividing section 126. The physical channel dividing section 126 divides downlink signals multiplexed into the downlink signal into respective signals.

The PBCH signal demodulation • decoding section 121 demodulates a PBCH signal including system information specific to the cell, and further decodes the signal. The PDCCH signal demodulation • decoding section 122 demodulates a PDCCH signal including scheduling information of a PUSCH signal and PDSCH signal for each user, and further decodes the signal. The PDCCH signal demodulation • decoding section 122 inputs scheduling information of uplink and downlink to a transmission/reception channel • signal format selecting section 131. The PHICH signal demodulation • decoding section 123 demodulates a PHICH signal to the PUSCH, and further decodes the signal. The PHICH signal demodulation • decoding section 123 inputs whether or not to retransmit the PUSCH to the transmission/reception channel • signal format selecting section 131 based on the PHICH signal. The PDSCH signal demodulation • decoding section demodulates a PDSCH signal including user data and control information of a higher layer shared among a plurality of mobile terminal apparatuses 10, and further decodes the signal. The CSI-RS reception section 125 demodulates a CSI-RS used only for measurement of channel state information, and further decodes the signal.

Further, the mobile terminal apparatus 10 has the transmission/reception channel • signal format selecting section 131. The transmission/reception channel • signal format selecting section 131 determines a signal of a higher priority based on the priority relationship between uplink and downlink signals when transmission and reception timing of uplink and downlink signals overlaps each other. Then, based on the determination result, the transmission/reception channel • signal format selecting section 131 selects transmission processing of the uplink signal or reception processing of the downlink signal to give priority. More specifically, when the transmission processing of the uplink signal is given priority, the transmission/reception channel • signal format selecting section 131 switches the switch 103c to the transmission system side with switch timing information. By this means, the mobile terminal apparatus 10 transmits the uplink signal via the transmission/reception antenna 101. When the reception processing of the downlink signal is given priority, the transmission/reception channel • signal format selecting section 131 switches the switch to the reception system side with the switch timing information. By this means, the mobile terminal apparatus 10 receives the downlink signal via the transmission/reception antenna 101.

In this case, the transmission/reception channel • signal format selecting section 131 may switch the switch 103c contrary to the priority relationship in a particular subframe notified by RRC signaling or PDCCH signal. In other words, in the particular subframe, the section 131 may give priority to reception processing of the downlink signal of a lower priority than the uplink signal, or may give priority to transmission processing of the uplink signal of a lower priority than the downlink signal. Further, when neither transmission processing of the uplink signal nor reception processing of the downlink signal is performed, the transmission/reception channel • signal format selecting section 131 separates the switch 103c from the transmission system and reception system with the switch timing information. By this means, the mobile terminal apparatus 10 halts the transmission and reception processing of uplink signal and downlink signal.

Further, when uplink and downlink signals are transmitted and received in the same subframe, the transmission/reception channel • signal format selecting section 131 selects the signal format shown in any of FIGS. 5A to 5C. When the transmission/reception method in the same subframe is controlled on the mobile terminal apparatus 10 side, the transmission/reception channel • signal format selecting section 131 inputs the signal format information to each signal generating section, each demodulation • decoding section and reception section.

For example, in the first transmission/reception method as shown in FIG. 5A, the PDSCH signal demodulation • decoding section 124 demodulates the PDSCH signal while leaving last several symbols based on the signal format information, and further decodes the signal. Further, the SRS generating section 114 generates an SRS in accordance with the last symbol. Meanwhile, in the second transmission/reception method as shown in FIG. 5B, the PUCCH signal generating section 112 selects the PUCCH format for HD-FDD based on the signal format information, and performs puncturing or rate matching on first several symbols to generate a PUCCH signal. Further, the PDCCH signal demodulation • decoding section 122 and PHICH signal demodulation • decoding section 123 demodulate the PDCCH signal and PHICH signal assigned to first several symbols based on the signal format information, and further decode the signals. Moreover, in the second transmission/reception method as shown in FIG. 5C, the PRACH signal generating section 113 selects the PRACH format for HD-FDD based on the signal format information, and performs puncturing on first several symbols to generate a PRACH signal. Further, the PDCCH signal demodulation • decoding section 122 and PHICH signal demodulation • decoding section 123 demodulate the PDCCH signal and PHICH signal assigned to first several symbols based on the signal format information, and further decode the signals.

In the transmission/reception in the same subframe, the transmission/reception channel • signal format selecting section 131 inputs the switch timing information to the switch 103c at a guard interval provided in the subframe. By this means, transmission of the uplink signal and reception of the downlink signal is switched in a single subframe.

As described above, according to the mobile terminal apparatus 10 according to this Embodiment, when transmission timing of an uplink signal and reception timing of a downlink signal overlaps each other in the mobile terminal apparatus, transmission/reception processing is performed selectively. Accordingly, for the mobile terminal apparatus 10 to which is applied HD-FDD, it is possible to cause the apparatus 10 to perform optimal operation when transmission timing of an uplink signal and reception timing of a downlink signal overlaps each other.

In addition, in the above-mentioned Embodiment, indication of a particular subframe is notified to the mobile terminal apparatus by RRC signaling or adding a control bit to the PDCCH signal, but is not limited thereto. The indication may be notified by any method, when the method enables the mobile terminal apparatus to be notified of the particular subframe.

Further, in the above-mentioned Embodiment, the priority relationship is set on the base station apparatus and the mobile terminal apparatus, and only the mobile terminal apparatus may be set for the priority relationship. Moreover, the priority relationship may be beforehand set on both the base station apparatus and the mobile terminal apparatus, may be notified from the base station apparatus to the mobile terminal apparatus, or may be notified from the mobile terminal apparatus to the base station apparatus.

The present invention is not limited to the above-mentioned Embodiment, and is capable of being carried into practice with various modifications thereof. For example, without departing from the scope of the invention, kinds of uplink signals, kinds of downlink signals, assignment positions of an uplink signal and downlink signal, the number of functional blocks, processing procedures and the like in the above-mentioned description are capable of being carried into practice with modifications thereof as appropriate. Further, the invention is capable of being carried into practice with modifications thereof as appropriate without departing from the scope of the invention.

The invention claimed is:

1. A terminal comprising:
a control circuit that when a transmission of an uplink signal and a reception of a download signal overlap each other within a time interval configured of a plurality of symbols, controls to transmit, as the uplink signal, an uplink control signal or a random access channel signal within the time interval, after a given interval that is provided to prevent transmission of the uplink signal and reception of the downlink signal from overlapping each other within the time interval, by using a format in which first several symbols are blanked in the time interval, in accordance with an instruction from a base station apparatus; and
a transmission/reception circuit that receives the downlink signal in the time interval and transmits the uplink signal after the given interval within the time interval.

2. The terminal according to claim 1, wherein the control circuit controls to receive a downlink control signal at a beginning of the time interval.

3. The terminal according to claim 1, wherein the uplink control signal is a PUCCH (Physical Uplink Control Channel) signal and the random access channel signal is a PRACH (Physical Random Access Channel) signal.

4. A communication control method for a terminal, comprising:

when a transmission of an uplink signal and a reception of a downlink signal overlap each other within a time interval configured of a plurality of symbols, controlling to transmit, as the uplink signal, an uplink control signal or a random access channel signal within the time interval, after a given interval that is provided to prevent transmission of the uplink signal and reception of the downlink signal from overlapping each other within the time interval, by using a format in which first several symbols are blanked in the time interval, in accordance with an instruction from a base station apparatus; and receiving the download link signal in the time interval and transmitting the uplink signal after the given interval within the time interval.

\* \* \* \* \*